United States Patent [19]
Ueno et al.

[11] Patent Number: 5,234,737
[45] Date of Patent: Aug. 10, 1993

[54] PHASE CHANGE OPTICAL RECORDING MEDIUM

[75] Inventors: Osamu Ueno; Hideo Kobayashi, both of Kanagawa, Japan

[73] Assignee: Fuji Xerox Co., Ltd., Tokyo, Japan

[21] Appl. No.: 826,856

[22] Filed: Jan. 28, 1992

[30] Foreign Application Priority Data

Jan. 28, 1991 [JP] Japan .................................. 3-25181
Jul. 10, 1991 [JP] Japan ................................ 3-196007

[51] Int. Cl.$^5$ ............................................. B32B 3/00
[52] U.S. Cl. ........................................ 428/64; 428/65; 428/411.1; 428/688; 428/913; 346/76 L; 346/135.1; 430/945; 369/288
[58] Field of Search ................ 428/64, 65, 411.1, 688, 428/913; 346/76 L, 135.1; 369/288; 430/945

[56] References Cited

U.S. PATENT DOCUMENTS 5,063,097  11/1991  Hirota et al. ......................... 428/65

Primary Examiner—Patrick J. Ryan
Assistant Examiner—Elizabeth Evans
Attorney, Agent, or Firm—Finnegan, Henderson, Farabow, Garrett & Dunner

[57] ABSTRACT

A phase change optical recording medium in which a recording layer is formed on a substrate whose optical characteristic changes with crystal and amorphous phase change. With a phase change optical recording medium according to the invention, the difference in refractivity between crystal and amorphous parts is large, and therefore the error in the reproduction of data is lessened and the average reflectivity is large so that the servo operation is made stable. Further, the thickness of the recording layer can be reduced according to the invention, and the amount of energy required for recording data can be reduced as much, so as to increase the number of times of recording operations, and improve the recording sensitivity.

8 Claims, 4 Drawing Sheets

LIGHT

PHASE CHANGE OPTICAL RECORDING MEDIUM

BACKGROUND OF THE INVENTION

This invention relates to an optical recording technique, and more particularly to a phase change optical recording medium in which a recording layer is formed on a substrate whose optical characteristic changes with crystal and amorphous phase change.

A so-called "phase change optical recording medium" is an example of an optical recording medium in which the recorded data can be rewritten. The phase change optical recording medium is based on a crystal and amorphous phase change. The phase change optical recording medium is used as follows: A laser beam having a diameter of the order of one micron is applied to the recording layer of the recording medium, and the recording layer's part thus irradiated with the laser beam is made amorphous by melting, and by cooling it quickly, to record data. On the other hand, an intermediate power laser bream is applied to the recording layer to hold the recording layer's part thus irradiated at a temperature higher than the crystallization temperature for a predetermined period of time, thereby to erase the data. Reproduction of the data is achieved as follows: A low power laser beam is applied to the recording layer, to detect the difference in optical characteristic between crystal and amorphous parts as the difference in the quantity of light between light beams reflected therefrom, thereby to reproduce the data. By modifying the intensity of the laser beam with high power and intermediate power according to data, current data can be written over the previous data.

In the phase change optical recording medium of this type, in general, protective layers are provided on the upper and lower surfaces of the recording layer, respectively, which is formed on a substrate. Of those protective layers, the one provided on the light incident side (hereinafter referred to as "a light incident side protective layer", when applicable) should function as follows: That is, it is essential for the light incident side protective layer to have a physical function to prevent the recording layer from being thermally deformed when data are written or rewritten with the laser beam or when the record is erased, and an optical function to increase the interference effect to thereby improve the CN ratio and recording sensitivity (cf. Published Unexamined Japanese Patent Application (OPI) No's 195537/1990 and 180945/1986). Heretofore, in order to give the above-described optical function to the light incident side protective layer, the protective layer material is made larger in refractive index than the substrate material, and the interference effect is utilized which is provided by the protective layer formed with the protective layer material larger in refractive index. Thus, it is essential that, in the phase change optical recording medium, the light incident side protective layer is larger in refractive index than at least the substrate. Thus, while the refractive index (n) of the substrate material is of the order of 1.45 to 1.6, the light incident side protective layer is made of a high refractive index material having a refractive index of 2.0 or higher, such as ZnS-SiO$_2$ (n =2.0) or ZnS (n =2.3).

The above-described phase change optical recording medium suffers from the following difficulties; When it is used for a recording operation, it is necessary to heat the recording material at a high temperature, higher than about 600° C. Thus, the recording operation requires a large quantity of energy; that is, the recording sensitivity is low, and the number of times of rewriting operations allowed is small.

In order to eliminate the above-described difficulties, a method has been proposed in which the thickness of the recording layer is decreased to reduce its thermal capacity, thereby to decrease the amount of energy required for writing, rewriting, or erasing data (cf. Published Unexamined Japanese Patent Application (OPI) No's 195537/1990 and 195538/1990). Since the amount of energy required for a recording operation is decreased in the above-described manner, the following merits are obtained: When it is assumed that the optical absorption coefficient is the same, then the recording sensitivity is increased, the thermal load of the optical recording medium is decreased, the thermal deformation of the recording layer is decreased, and the number of times of rewriting operations is increase. (T. Ohta et al. SPIE, vol 1078 ODSTM, p 27, 1989).

However, in the phase change optical recording medium, it is not allowed to reduce the thickness of the recording layer to less than a certain value. If, in the case where the material of the recording layer is of a Ge-Sb-Te group, the thickness of the recording layer is reduced to smaller than 20 nm as shown in FIG. 8, then the difference in reflectivity between crystal and amorphous parts in the recording layer is decreased, and the CN ratio is not large enough, and the reflectivity of the whole recording medium is decreased, with the result that the servo operation such as a focusing servo, a tracking servo and the like becomes unstable. Thus, it is limited to some extent to decrease the thickness of the recording layer to improve the recording sensitivity and to increase the number of times of rewriting operations.

SUMMARY OF THE INVENTION

The present inventors have conducted intensive research on a phase change optical recording medium, to increase the number of times of rewriting operations and to improve the recording sensitivity, and found that, by forming the light incident side protective layer with a material having a relatively low refractive index, not only the number of times of rewriting operations can be increased but also the recording sensitivity can be improved, and accomplished this invention.

Accordingly, an object of this invention is to provide a phase change optical recording medium which permits a large number of times of rewriting operations and is high in recording sensitivity.

According to the present invention, the above, and other objects of the invention are accomplished by the provision of a phase change optical recording medium comprising a substrate, a recording layer provided on the substrate, the optical characteristic of which changes with phase change and a protective layer provided at least on a light incident side of the recording layer for preventing the thermal deformation of the recording layer, the optical characteristic of the recording layer being changed optically or thermally to record and reproduce data, the thickness of the recording layer being smaller than 20 nm, and a light incident side protective layer provided on the light incident side of the recording layer being of a material whose refractive index is substantially equal to or lower than the refractive index of the substrate.

Examples of a material forming the substrate are inorganic materials such as a glass and resinous materials such as polycarbonates, acrylic resins, polyolefins, polydichloropentadienes, polyimides, epoxy resins. These materials forming the substrate have refractive indexes which are within a range of 1.45 to 1.6. The thickness of the substrate is determined to about 1.2 mm so that there occurs no deformation and there occurs no undesired effect due to a dust.

Examples of a material forming a recording layer provided onto the substrate, optical characteristics of which changes with crystal and amorphous phase change due to the application of light so as to record, reproduce and erase data, are Ge-Sb-Te, In-Ge-Sb-Te, Ge-Sb-Te-Co, Ge-Sb-Te-Pd, and Ge-Te. Preferably, Ge-Sb-Te and In-Ge-Sb-Te are used as the material. The thickness of the recording layer is made smaller than 20 nm, and preferably smaller than 15 nm, because no sufficient phase change occurs with a recording layer larger than 20 nm. Since it is difficult to produce a uniform recording layer having a thickness less than 5 nm, the thickness of the recording layer is preferably set within a range of 5 nm to 20 nm.

A material forming a single protective layer 2 is a material whose refractive index n is equal to or less than that of the recording layer and whose thermal expansion coefficient is relatively small so as to prevent thermal deformation from occurring. Concrete examples whose refractive index is equal to or smaller than 1.7 are $SiO_2(n:1.45)$, $MgF_2(n:1.38)$, $CaF_2(n:1.25)$, $Al_2O_3(n:1.62)$, $CeF_3(n:1.63)$, $NdF_3(n:1.6)$, $LaF_3(n:1.59)$, $NaF(n:1.34)$, $NiF(n:1.36)$, and $Na_3AlF_6(n:1.35)$. A mixture of the plural materials may be employed as a material forming the single protective layer, whose refractive idex is defined as an intermediate range of refractive indexes of the materials.

The first example $SiO_2$ has not only a small refractive index of 1.45 but has very small linear thermal expansion coefficient of $0.55 \times 10^{-6}/°C$. that is much smaller than coefficient of linear thermal expansion of $ZnS-SiO_2$, $5 \times 10^{-6}/°C$. Accordingly, it is preferable to employ either $SiO_2$ or a mixture including such a material of $SiO_2$ as a primary material. In case of a single light incident side protective layer, the thickness thereof is equal to that of an ordinary protective layer, and it is preferable to employ the layer having a thickness of 20 to 500 nm. More preferable range is 50 to 200 nm.

In case of the protective layer 2 formed by multiple layers, dielectric materials other than the above described materials, such as ZnS, $ZnS-SiO_2$, SiC, $In_2O_3$, $SnO_2$, $Si_3N_4$, $Al_2O_3$, $Ta_2O_5$, SiO, TiO, $TiO_2$, TiN, TiC, $ZrO_2$ and the like are employed, and further, a mixture of these materials may be employed. In this case, as an equivalent refractive index N is made smaller, the thickness of the recording layer can be made smaller. The refractive index thereof is made smaller than that of the substrate (n:1.5), and preferably made equal to or smaller than 1.2.

In case of the protective layer 2 formed by three layers, it is necessary to make the refractive index np of the second layer substantially equal to that of the substrate. More concretely, the difference in the refractive index between those of the substrate and the protective layer is made smaller than about three (3), preferably equal to or smaller than 0.2.

An example of ultraviolet ray setting resin is an acrylate ultraviolet ray setting resin. Examples of a material forming a protective plate are inorganic materials such as a glass and resinous materials such as polycarbonates, acrylic resins, polyolefins, polydichloropentadienes, polyimides, epoxy resins which are the same type material as those of the substrate.

Examples of a method for forming the recording layer and the protective layer at a light incident side are a vacuum evaporation method, a sputtering method, an ion plating method, a molecular-beam epitaxy (MBE) method, a chemical vapor deposition (CVD) method.

The reason why the optical characteristics of a phase change optical recording medium having a thin recording layer can be improved by reducing the refractive index of a protective layer will be described with reference to FIGS. 4 to 6.

With a conventional optical recording medium as shown in FIG. 4, a preferred optical characteristic is attained by using interference effect primarily due to reflection at upper and lower interfacing surfaces of the protective layer 2. In case of reducing the thickness of the recording layer 3 as shown in FIG. 5, an amount of light passing through the recording layer 3 is increased to thereby make the interference effect smaller resulting in degrading the optical characteristic. On the other hand, according to the present invention, the refractive index of the protective layer 2 is made smaller so that the difference between the protective layer 2 and the recording layer 3 in the refractive index becomes larger. Therefore, an amount of light reflected at the interfacing surface of the two layers 2 and 3 becomes larger. As the thickness of the recording layer 3 is made thinner, reflectivity at the interfacing surfaces of the protective layer 4 and the reflecting layer 5 becomes larger. As a result of the interference of these two reflecting lights becoming larger, it is possible to obtain a desired optical characteristics. This phenomenon is shown in FIG. 6.

In case of the protective layer 2 including the first to third layers, as described with reference to equations hereinafter, an optical characteristic thereof is optically equivalent to that of an optical recording medium including a single protective layer having a refractive index N.

In contrast, in the case where the protective layer 2 is composed of two layers, an refractive index np of the second layer provided onto the substrate is substantially equal to that of the substrate, and therefore the optical characteristic thereof is regarded approximately as that of the medium having two protective layers as shown in FIG. 2. Consequently, with such a medium having two protective layers, it is also possible to improve the optical characteristic and to reduce thermal load upon recording.

DESCRIPTION OF THE PREFERRED EMBODIMENTS

Figure 1:
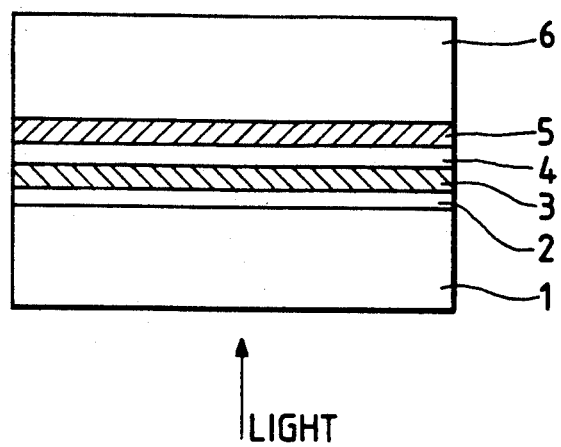
FIG. 1 is a sectional diagram showing the layer structure of a phase change optical recording medium which is a first embodiment of this invention.

As shown in FIG. 1 which shows a first embodiment of the present invention, a phase change optical recording medium includes a light incident side protective layer 2 of $SiO_2$ having a refractive index of 1.45 and being 160 nm in thickness, a recording layer 3 of $Ge_2Sb_2Te_5$ being 13 nm in thickness, a light transparent side protective layer 4 of AlN being 30 nm in thickness, and a reflecting layer 5 of Al-Ti being 100 nm in thickness. The above described layers 2 to 5 are laminated on a substrate 1 of polycarbonate having a refractive index of 1.58 by sputtering in the stated order. Acrylate ultraviolet ray setting resin is coated and hardened to the reflecting layer 5 to form a surface protective layer 6 of acrylate ultra-violet light setting resin being 10μm in thickness thereon.

With respect to the phase change optical recording medium thus formed, the reflectivity $R_A$ of the as—deposited film (amorphous phase) and the reflectivity $R_x$ of its crystallized (crystal phase) are measured to thereby obtain a reflectivity difference $(R_x - R_A)$ and an average reflectivity $((R_x + R_A)/2)$.

As indicated in the following Table 1, both the reflectivity difference and the average reflectivity are larger than those in comparison examples (described later). That is, although the medium has a recording layer of 13 nm, which is small in thickness, the optical characteristic is remarkably improved.

A second embodiment of the invention is substantially same as the first embodiment except that the light incident side protective layer 2 is a layer of $(SiO_2)_{80}(ZnS)_{20}$ having a refractive index of 1.6 and being 160 nm in thickness. The phase change optical recording medium is evaluated in the same manner as in the above-described first embodiment.

The evaluation revealed that, when compared with the comparison examples, it is greatly improved in optical characteristic as indicated in the following Table 1.

A second embodiment of the invention is substantially same as the first embodiment except that the light incident side protective layer 2 is a layer of $CaF_2$ having a refractive index of 1.25 and being 160 nm in thickness and the thickness of the recording layer 3 is set to 10 nm. The phase change optical recording medium thus formed is evaluated in the same manner as in the case of the above-described first embodiment.

The evaluation revealed that, when compared with the comparison examples, it is greatly improved in optical characteristic as indicated in the following Table 1.

A third embodiment of the invention is substantially same as the first embodiment except that the light incident side protective layer 2 is a layer of $(SiO_2)_{80}(ZnS)_{20}$ having a refractive index of 1.4 and being 160 nm in thickness. The phase change optical recording medium thus formed is evaluated in the same manner as in the above-described first embodiment.

The evaluation revealed that, when compared with the comparison examples, it is greatly improved in optical characteristic as indicated in the following Table 1.

Figure 2:
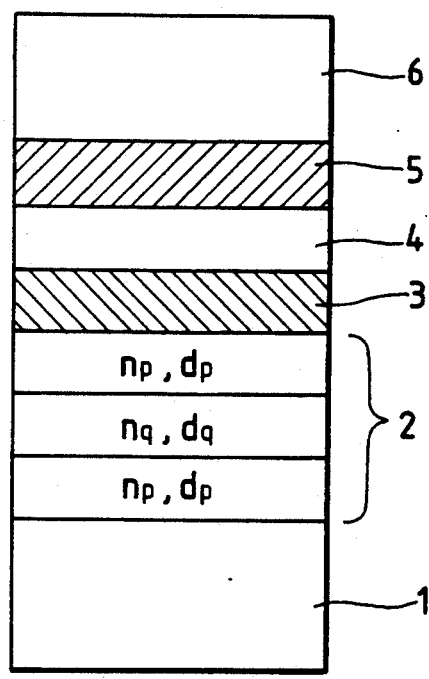
FIG. 2 is a sectional diagram showing the layer structure of a phase change optical recording medium which is a fifth embodiment of the invention.

FIG. 2 is a sectional diagram showing the layer structure of a phase change optical recording medium which is a fifth embodiment of the invention. The fifth embodiment of the invention is different from the first embodiment in the layers 2 to 4. A light incident side protective layer 2 formed on the substrate 1 is made up of three layers, namely, an $SiO_2$ layer having a refractive index $n_p$ of 1.45 and being 130 nm in thickness $d_p$, an AlN layer having a refractive index $n_q$ of 1.9 and being 140 nm in thickness $d_q$, and an $SiO_2$ layer being 130 nm in thickness, the thickness of the recording layer 3 is set to 10 nm, and the light transparent side protective layer 4 is an $SiO_2$ being 45 nm in thickness. The phase change optical recording medium thus formed is evaluated in the same manner as in the above-described first embodiment.

The evaluation revealed that, when compared with the comparison examples, it is greatly improved in optical characteristic as indicated in the following Table 1.

The equivalent refractive index N calculated from the following equations (1), (2) and (3) is about 1.1. Thus, the recording medium is optically equivalent to the one which has a light incident side protective layer having a refractive index of 1..

$$g_p = (2\pi/\lambda)n_p d_p \quad (1)$$

$$g_q = (2\pi/\lambda)n_q d_q \quad (2)$$

$$N = n_p \left[ \frac{n_p n_q \sin 2g_p \cos g_q + (n_q^2 \cos^2 g_p - n_p^2 \sin^2 g_p)\sin g_q}{n_p n_q \sin 2g_p \cos g_q + (n_p^2 \cos^2 g_p - n_q^2 \sin^2 g_p)\sin g_q} \right]^{\frac{1}{2}} \quad (3)$$

Figure 3:
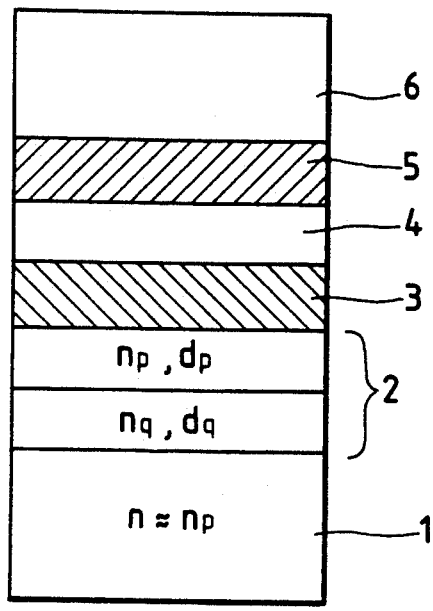
FIG. 3 is a sectional diagram showing the layer structure of a phase change optical recording medium which is a sixth embodiment of the invention.
Figure 4:
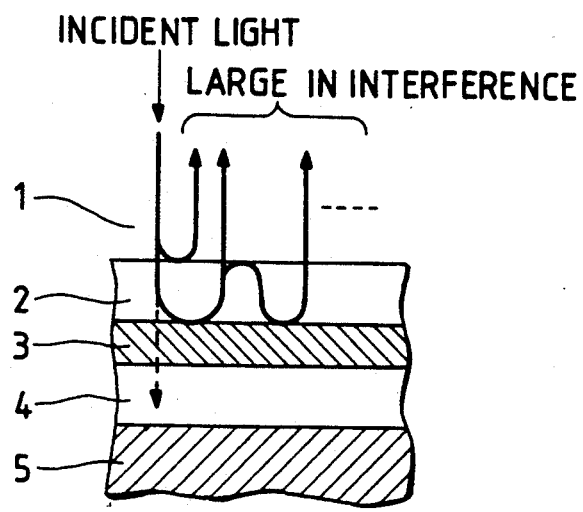
FIG. 4 is a sectional diagram for a description of the optical action of a conventional optical recording medium.
Figure 5:
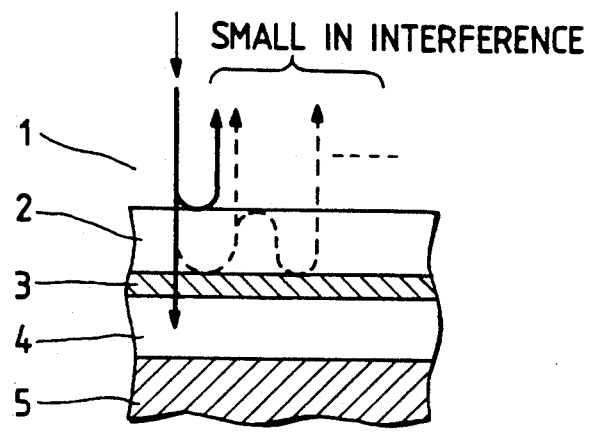
FIG. 5 is an explanatory diagram for a description of the optical action in the case where the recording layer of the conventional optical recording medium is reduced in thickness.
Figure 6:
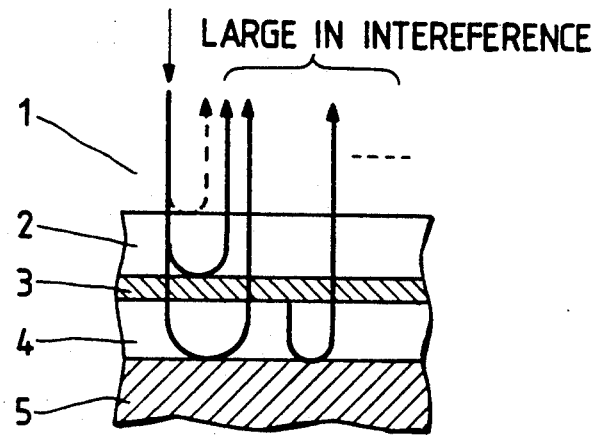
FIG. 6 is an explanatory diagram for a description of the optical action of the phase change optical recording medium according to the invention.

A sixth embodiment of the invention whose cross-section is shown in FIG. 3, is substantially same in layer construction as those of the fifth embodiment of the invention except that the light incident side protective layer 2 formed on the substrate 1 is made up of two layers, namely, an AlN layer having a refractive index $n_q$ of 1.9 and being 140 nm in thickness $d_q$ and an $SiO_2$ layer of a refractive index $n_p$ of 1.45 and being 130 nm in thickness $d_p$. The phase change optical recording medium thus formed is evaluated in the same manner as in the above-described first embodiment.

The evaluation revealed that, when compared with the comparison examples, it is greatly improved in optical characteristic as indicated in the following Table 1.

The equivalent refractive index N calculated from the above-described equations (1), (2) and (3) is about 1.1. Originally, the equivalent refractive index should be calculated for a three layer structure. Nevertheless, the recording medium is optically equivalent to the one which has a light incident side protective layer having a refractive index of 1.1.

Figure 7:
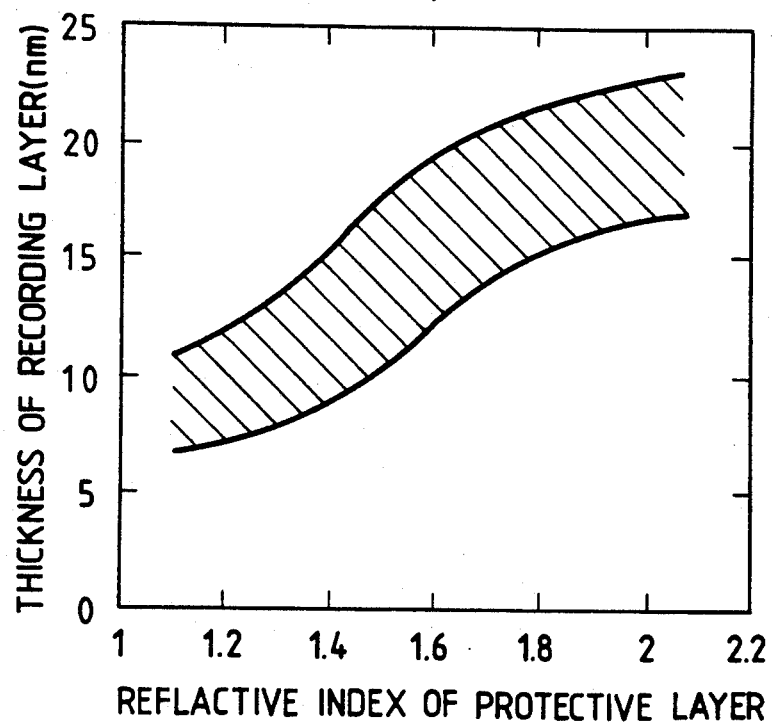
FIG. 7 is a graphical representation indicating that the optical action of the phase change optical recording medium of the invention makes it possible to reduce the thickness of the recording medium.
Figure 8:
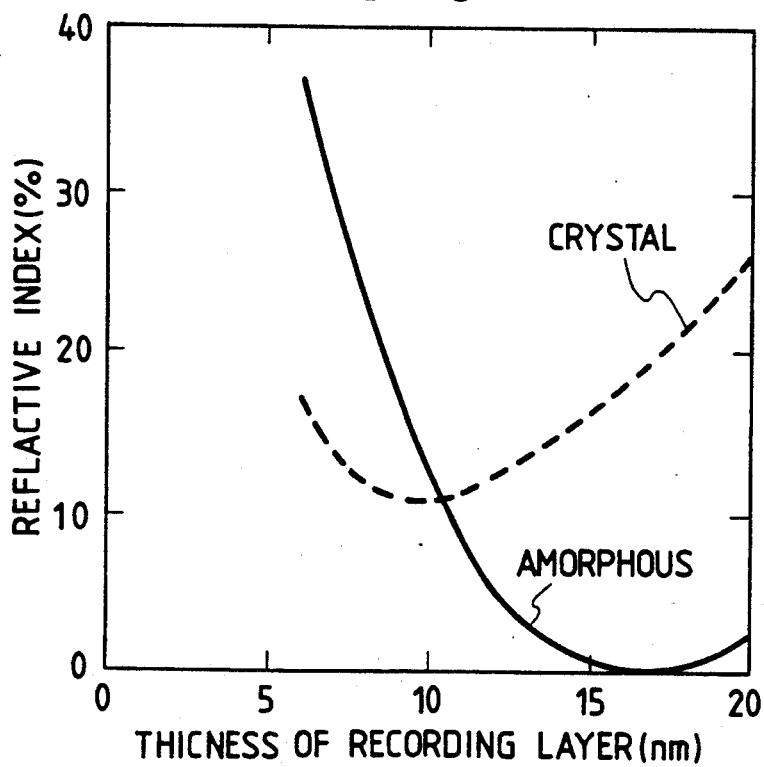
FIG. 8 is a graphical representation indicating the relationship between the thickness of the recording layer of a conventional phase change optical recording medium and the reflectivity.

It can be determined from the above-described embodiments and optical calculations that the relationship between the refractive index of the light incident side protective layer and the thickness of the recording layer with which the optical characteristic is improved is as indicated in FIG. 7. As is seen from FIG. 7, the thickness of the recording layer with which the optical characteristic is improved can be decreased by reducing the refractive index of the light incident side protective layer.

A phase change optical recording medium is manufactured which is same as the above-described first embodiment except that the light incident side protective layer 2 is a layer of $(ZnS)_{80}(SiO_2)_{20}$ having a refractive index 2.0 and being 160 nm in thickness. The phase change optical recording medium thus manufactured is evaluated in the same manner as in the case of the above-described first embodiment as shown in the following Table 1.

The evaluation revealed that the recording medium is inferior in optical characteristic to the embodiments.

A phase change optical recording medium is manufactured which is same as the above-described first embodiment except that the light incident side protective layer 2 is a layer of $(ZnS)_{80}(SiO_2)_{20}$ having a refractive index of 2.0 and being 160 nm in thickness, and the thickness of the recording layer 3 is set to 10 nm. The phase change optical recording medium thus manufactured is evaluated in the same manner as in the case of the above-described first embodiment.

The evaluation revealed that the recording medium is inferior in optical characteristic to the embodiments as indicated in the following Table 1.

TABLE 1

| | Light Incident side protective layer | Recording Medium Thickness (nm) | Reflectivity (%) | Average Reflectivity (%) |
|---|---|---|---|---|
| Embodiment 1 | $SiO_2$ | 13 | 29 | 13 |
| Embodiment 2 | $(SiO_2)_{80}(ZnS)_{20}$ | 13 | 26 | 12 |
| Embodiment 3 | $CaF_2$ | 10 | 28 | 13 |
| Embodiment 4 | $(SiO_2)_{80}(CaF_2)_{20}$ | 10 | 23 | 12 |
| Embodiment 5 | $SiO_2/AlN/SiO_2$ | 10 | 29 | 13 |
| Embodiment 6 | $SiO_2/AlN$ | 10 | 26 | 13 |
| Comp. Ex. 1 | $(ZnS)_{80}(SiO_2)_{20}$ | 13 | 10 | 8 |
| Comp. Ex. 2 | $(ZnS)_{80}(SiO_2)_{20}$ | 10 | −3 | 10 |

In the phase change optical recording medium according to the invention, the difference in refractivity between crystal and amorphous parts is large, and therefore the error in the reproduction of data is lessened. Furthermore, in the phase change optical recording medium of the invention, the average reflectivity is large. Accordingly, with the recording medium, the servo operation is stable.

In addition, the thickness of the recording layer can be reduced according to the invention, and the amount of energy required for recording data can be reduced as much. This will increase the number of times of recording operations, and improve the recording sensitivity.

What is claimed is:

1. A phase change optical recording medium comprising: a substrate; a recording layer provided on said substrate, the optical characteristic of which changes with phase change; and a protective layer provided at least on a light incident side of said recording layer for preventing the thermal deformation of said recording layer, the optical characteristic of said recording layer being changed optically or thermally to record and reproduce data, the thickness of said recording layer being smaller than 20 nm, and a light incident side protective layer provided on the light incident side of said recording layer being of a material whose refractive index is equal to or lower than the refractive index of said substrate.

2. The phase change optical recording medium as defined in claim 1 wherein the refractive index of said light incident side protective layer is 1.7 or less.

3. The phase change optical recording medium as defined in claim 1 wherein said light incident side protective layer comprises a first layer, a second layer and a third layer formed in the state order from the side of said substrate, and wherein the equivalent refractive index N of said light incident side protective which is calculated from equations (1), (2) and (3) is smaller than the refractive index of said substrate:

$$g_p = (2\pi/\lambda)n_p d_p \quad (1)$$

$$g_q = (2\pi/\lambda)n_q d_q \quad (2)$$

$$N = n_p \left[ \frac{n_p n_q \sin 2g_p \cos g_q + (n_q^2 \cos^2 g_p - n_p^2 \sin^2 g_p)\sin g_q}{n_p n_q \sin 2g_p \cos g_q + (n_p^2 \cos^2 g_p - n_q^2 \sin^2 g_p)\sin g_q} \right]^{\frac{1}{2}} \quad (3)$$

where $n_p$ is the refractive index of said first and third layers, $d_p$ is the thickness of said first and third layers, $n_q$ and $d_q$ are the refractive index and the thickness of said second layer, respectively, and $\lambda$ is the wavelength of a light beam employed.

4. The phase change optical recording medium as defined in claim 1 wherein said light incident side protective layer comprises a first layer and a second layer formed in the state order from the side of said substrate, and wherein the equivalent refractive index N of said light incident side protective which is calculated from equations (1), (2) and (3) is smaller than the refractive index of said substrate:

$$g_p = (2\pi/\lambda)n_p d_p \quad (1)$$

$$g_q = (2\pi/\lambda)n_q d_q \quad (2)$$

$$N = n_p \left[ \frac{n_p n_q \sin 2g_p \cos g_q + (n_q^2 \cos^2 g_p - n_p^2 \sin^2 g_p)\sin g_q}{n_p n_q \sin 2g_p \cos g_q + (n_p^2 \cos^2 g_p - n_q^2 \sin^2 g_p)\sin g_q} \right]^{\frac{1}{2}} \quad (3)$$

where $n_p$ and $d_p$ are the refractive index and the thickness of said first layer, $n_q$ and $d_q$ are the refractive index and the thickness of said second layer, respectively, and $\lambda$ is the wavelength of a light beam employed.

5. The phase change optical recording medium as claimed in claim 1 wherein the thickness of said recording layer is 15 nm or less.

6. The phase change optical recording medium as claimed in claim 2 wherein the thickness of said recording layer is 15 nm or less.

7. The phase change optical recording medium as claimed in claim 3 wherein the thickness of said recording layer is 15 nm or less.

8. The phase change optical recording medium as claimed in claim 4 wherein the thickness of said recording layer is 15 nm or less.

* * * * *